United States Patent
Cai et al.

(10) Patent No.: US 8,185,127 B1
(45) Date of Patent: May 22, 2012

(54) METHOD AND SYSTEM FOR ALLOCATING NETWORK RESOURCES FOR A SINGLE USER OPERATING MULTIPLE DEVICES

(75) Inventors: Zheng Cai, Fairfax, VA (US); Arun Manroa, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 872 days.

(21) Appl. No.: 12/029,987

(22) Filed: Feb. 12, 2008

(51) Int. Cl.
*H04W 72/00* (2009.01)
*H04M 11/00* (2006.01)

(52) U.S. Cl. ..................................... 455/452.2; 455/405
(58) Field of Classification Search .................. 455/405, 455/450, 452.2, 464, 508
See application file for complete search history.

(56) References Cited

U.S. PATENT DOCUMENTS

| | | | |
|---|---|---|---|
| 7,076,552 B2 * | 7/2006 | Mandato | 709/226 |
| 7,516,219 B2 * | 4/2009 | Moghaddam et al. | 709/225 |
| 2002/0061753 A1 * | 5/2002 | Lysejko et al. | 455/450 |
| 2002/0128017 A1 * | 9/2002 | Virtanen | 455/452 |
| 2003/0069018 A1 | 4/2003 | Matta et al. | |
| 2003/0174647 A1 | 9/2003 | Gutierrez et al. | |
| 2004/0060059 A1 * | 3/2004 | Cohen | 725/30 |
| 2004/0106431 A1 * | 6/2004 | Laroia et al. | 455/552.1 |
| 2004/0253940 A1 * | 12/2004 | Andrews et al. | 455/405 |
| 2006/0209891 A1 | 9/2006 | Yamada et al. | |
| 2007/0025264 A1 | 2/2007 | Cheng et al. | |
| 2007/0153687 A1 | 7/2007 | Attar et al. | |
| 2010/0105401 A1 | 4/2010 | Chun et al. | |

OTHER PUBLICATIONS

USPTO Office Action Summary from U.S. Appl. No. 12/365,187 mailed Jan. 24, 2011.

* cited by examiner

*Primary Examiner* — Nick Corsaro
*Assistant Examiner* — Joel Ajayi (57) ABSTRACT

A method and system are provided for allocating usage of network resources in a communication network. In an embodiment, a quality of service profile assigned to a user account is established where the user account comprises user information for a first wireless device and a second wireless device. A first usage request from the first wireless device is received and registered for access to the communication network. Use of the communication network is allocated to the first wireless device based upon the quality of service profile. A second usage request is received and registered from the second wireless device for access to the communication network. Use of the communications network is allocated to the second wireless device based upon the quality of service profile and the use of the communication network by the first wireless device.

20 Claims, 9 Drawing Sheets

FIGURE 7

METHOD AND SYSTEM FOR ALLOCATING NETWORK RESOURCES FOR A SINGLE USER OPERATING MULTIPLE DEVICES

TECHNICAL BACKGROUND

Broadband wireless technologies are poised to take advantage of the tremendous growth in broadband access and wireless communications. Broadband users today enjoy a multitude of high-bandwidth applications utilizing their digital subscriber line (DSL) or cable modem technologies. In parallel, wireless communication users are adopting wireless devices as their primary communication means at an ever increasing rate. As broadband and wireless technologies meet, there are significant opportunities for even greater expansion of the applications and devices that are today limited to only one or the other of these technologies.

Consumers today are using portable electronic devices in record numbers. Portable music players or MP3 players, video players, cellular telephones, and personal digital assistants are some of the devices that have gained popularity over the years. Additionally, consumers have the ability to share information, conduct business and seek entertainment utilizing the broadband access technologies described above. Users are now seeking to combine both worlds and to utilize their portable devices to have the same broadband experience. Applications that enable web surfing, video streaming, interactive gaming, voice calling are just a sample of what is becoming available to subscribers of wireless broadband technologies.

As the demand for wireless broadband access increases, the burden on communication networks and their network elements also increases. Consumers that are adopting broadband wireless devices are doing so in a new subscription model whereby the consumer only needs to purchase one subscription with the network operator. Thus, a single subscriber may have the ability to have multiple devices accessing the network at the same time. This leads to a significant increase in the utilization of the network and may contribute to a degradation of quality as seen by the network subscribers.

OVERVIEW

Generally described, a method is provided for allocating usage of network resources in a communication network. In an embodiment, a quality of service profile assigned to a user account is established where the user account comprises user information for a first wireless device and a second wireless device. A first usage request from the first wireless device is received and registered for access to the communication network. Use of the communication network is allocated to the first wireless device based upon the quality of service profile. A second usage request is received and registered from the second wireless device for access to the communication network. Use of the communications network is allocated to the second wireless device based upon the quality of service profile and the use of the communication network by the first wireless device.

In another embodiment, a communication system is provided for allocating usage of network resources for a user account in a communication network for a first wireless device and a second wireless device. A user account database is provided that comprises a quality of service profile and user information for the first wireless device and the second wireless device. Also, a control node is provided that is configured to receive a first usage request from the first wireless device and receive a second usage request from the second wireless device. The control node also allocates use of the communication network for the first wireless device and the second wireless device using the quality of service profile and the use of the communication network by the first wireless device and the second wireless device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

As devices and appliances are introduced with wireless communications capabilities, the increase in subscriber wireless traffic may negatively impact the quality of the wireless communication service for all users. As such, different methods and systems are needed to overcome the increased burden on wireless network resources. One such solution is to allocate network resources utilized by a subscriber when a subscriber has multiple devices operating on a communication network. By monitoring and allocating a subscriber's use of the network, network operators can effectively avoid many of the negative impacts on the network from a growing subscriber base.

Figure 1:
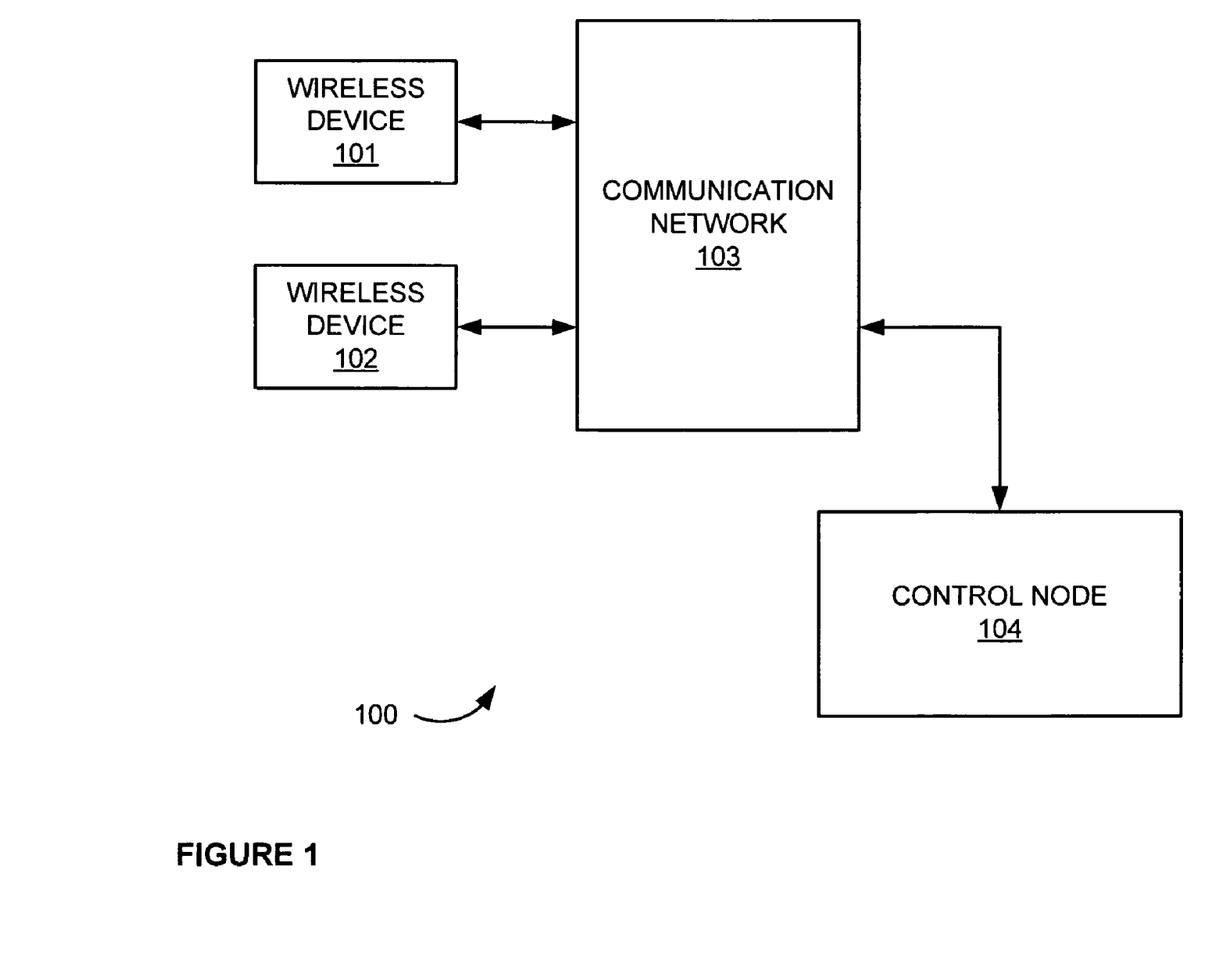
FIG. 1 is a block diagram illustrating an example of a communication system for allocating network resources.

FIG. 1 is a block diagram illustrating an exemplary embodiment for allocating the use of network resources by a user operating multiple wireless devices on a wireless network based upon various criteria and permissions granted to the user. FIG. 1 comprises wireless device 101, wireless device 102, communication network 103 and control node 104. Wireless devices 101 and 102 exchange information with communication network 103. Control node 104 exchanges information with communication network 103.

Wireless device 101 and wireless device 102 may be any device that has wireless communication connectivity. Wireless device 101 and 102 could include telephones, smartphones, mobile phones, cellular phones, personal digital assistants (PDAs), personal communicators, handheld game consoles, personal computers (PCs), Ultra-Mobile personal computers (UMPCs), handheld televisions and any other consumer appliance with wireless communication capabilities.

Communication network 103 includes any type of network that offers communications capabilities between users. Communication network 103 could be any packet-based network or packet switching system where packets are routed over data links shared with other traffic. Characteristics of packet-based networks include optimizing channel capacity available in a network, minimizing transmission latency and increasing robustness of communication. For example, communication network 103 could include many of the public switched data networks such as the internet protocol network, Frame Relay, Asynchronous Transfer Mode (ATM), General Packet Radio Service (GPRS), Ethernet and others. Communication network 103 could also include any number of private data networks that would utilize similar protocols.

Communication network 103 could also comprise any circuit-based communications network including the public switched telephone network (PSTN). Circuit-switching networks may be characterized as communication networks that establish dedicated circuits or channels between nodes and terminals to enable users to communication with one another.

Communication network 103 would also comprise a radio access network (RAN) to enable wireless communication for wireless device 101 and 102. The RAN may be a single wireless network that utilizes conventional wireless communication protocols. Alternatively, the RAN may include multiple wireless networks utilizing different wireless protocols. Wireless protocols include, but are not limited to, code division multiple access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX) and the like. Depending on the particular wireless protocol utilized by the RAN, the RAN may be comprised of various elements, including base stations, base station controllers, mobile switching centers (MSCs), access service networks (ASNs), ASN gateways (ASN-GWs) and other RAN elements that are known to those skilled in the art.

Control node 104 comprises any computer system that that has the ability to communicate and exchange information with communication network 103 and wireless device 101 or 102 using communication network 103. Examples of control node 104 include servers, application servers, personal computers, computer workstations, laptop computers, and any other computing device. Control node 104 could also be comprised of a programmed general-purpose computer, although those skilled in the art will appreciate that programmable or special purpose circuitry and equipment may be used and such functionality may be distributed among multiple computing units.

Control node 104 may also include functions typically found in telecommunication networks including all the necessary management functions for communication network 103 that may be operated by a single entity or by multiple entities. Managing communication network 103 comprises billing, authenticating and other network management functions to facilitate tracking a user's activity on a telecommunications network. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management. Elements that may perform management functions comprise authentication servers, provisioning servers, security servers, billing platforms and any other platform that enables a network provider to manage its network.

As described above, communication network 103 includes multiple network elements. Each of these elements may have limitations inherent to their design. Examples of these limitations may include capacity or bandwidth constraints. It is thus advantageous to the network operator to manage the network elements efficiently to ensure that the network operates in a proper manner to serve its subscriber base that would utilize these elements while operating devices and applications residing on the devices.

Examples of capacity or bandwidth constraints include throughput through a network element, node or communication link that may be referred to as the element's capacity. With digital networks, throughput may be measured as the amount of digital data per time unit, such as bit per second (bit/s or bps), that is delivered over a link or through a node. Other measures known in the skill of the art may also be used to determine capacities' of network elements.

Figure 2:
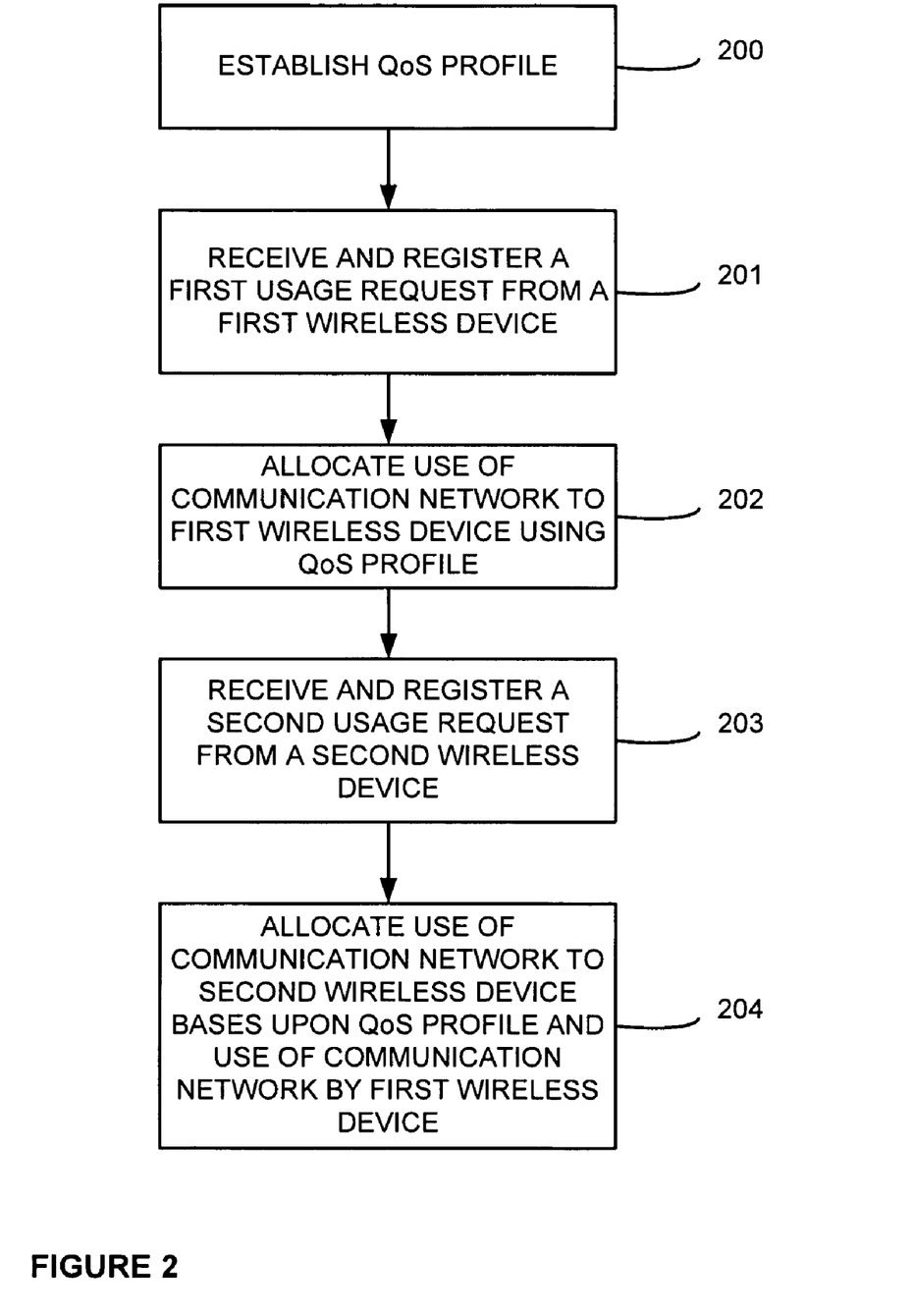
FIG. 2 is a process diagram illustrating a method for allocating use of a communication network among multiple devices.

In operation, as illustrated in FIG. 2, a quality of service (QoS) profile is established for a user account (200). A user account includes any information about a subscriber utilizing the communication system illustrated in FIG. 1. Examples of subscriber information would include identity information, the type of subscription plan or contract, credit information, and other information that would be typically associated with a wireless subscription with a network operator. The user account would also include a QoS profile for the user account. The QoS profile comprises permissions and restrictions for use of the communication system or network for the user to utilize services on the network. Criteria that may be analyzed for determining a QoS profile include throughput, packet error rate, delay and jitter that may be associated with the use of an application on the network. Network operators may utilize QoS profiles to establish levels of service for their subscribers. For example, one measure that may be utilized is a bandwidth parameter, criteria or threshold that would determine the permitted use of a network's resources by a user's application.

A usage request is received and registered from a first wireless device (201). Multiple network elements may receive the usage request, including control node 104. Registering the usage request may also be made by multiple network elements. These network elements would include many of the management functions and elements described above. For example, the usage request may be received by the RAN elements and passed along to be registered in the RAN and core communication network.

Use of the communication network is allocated to the first wireless device based upon the QoS profile (202). As described above, the QoS profile includes user permissions for utilizing the communication network. The first wireless device may use the communication network in many ways, including making voice calls, establishing data sessions, streaming video, sharing text messages and utilizing any other communication capability of the wireless device. Each of these uses requires network resources, including varying levels of bandwidth.

A usage request is received and registered from a second wireless device (203). The request and registering of the second wireless device may be made in a similar fashion as described for the first wireless device. Note that different network elements may be utilized by the second wireless device including alternative RAN elements such as base stations or gateways.

Use of the communication network is allocated to the second wireless device based upon the QoS profile and the use of the communication network by the first wireless device (204). The first wireless device may be utilizing all of the network resources that are permitted by the user's QoS profile. If so, then the second wireless device may be denied access to the communication network. If resources remain, then the second wireless device would be allocated the remaining resources as indicated in the QoS profile.

The QoS profile described above may also contain a database of a user's devices associated with a user's account. The QoS profile may provide a priority factor for a particular device or device identifier such as a phone number or device id. If a particular device has priority flag noted, then when that device requests access to the network, it is given priority over other devices assigned to the user and allocated network resources accordingly. Alternatively, a device may be assigned a fixed bandwidth allocation. For example, a voice over IP (VoIP) device may be assigned a fixed bandwidth parameter of 200 kbps and when this device requests access to the network, it is assigned this bandwidth. Additionally, a device may be assigned a dynamic bandwidth allocation where a bandwidth allocation would fluctuate depending on the use by the wireless device. For example, a wireless device utilizing a data application may need varying sizes of bandwidth during a given data session.

Figure 3:
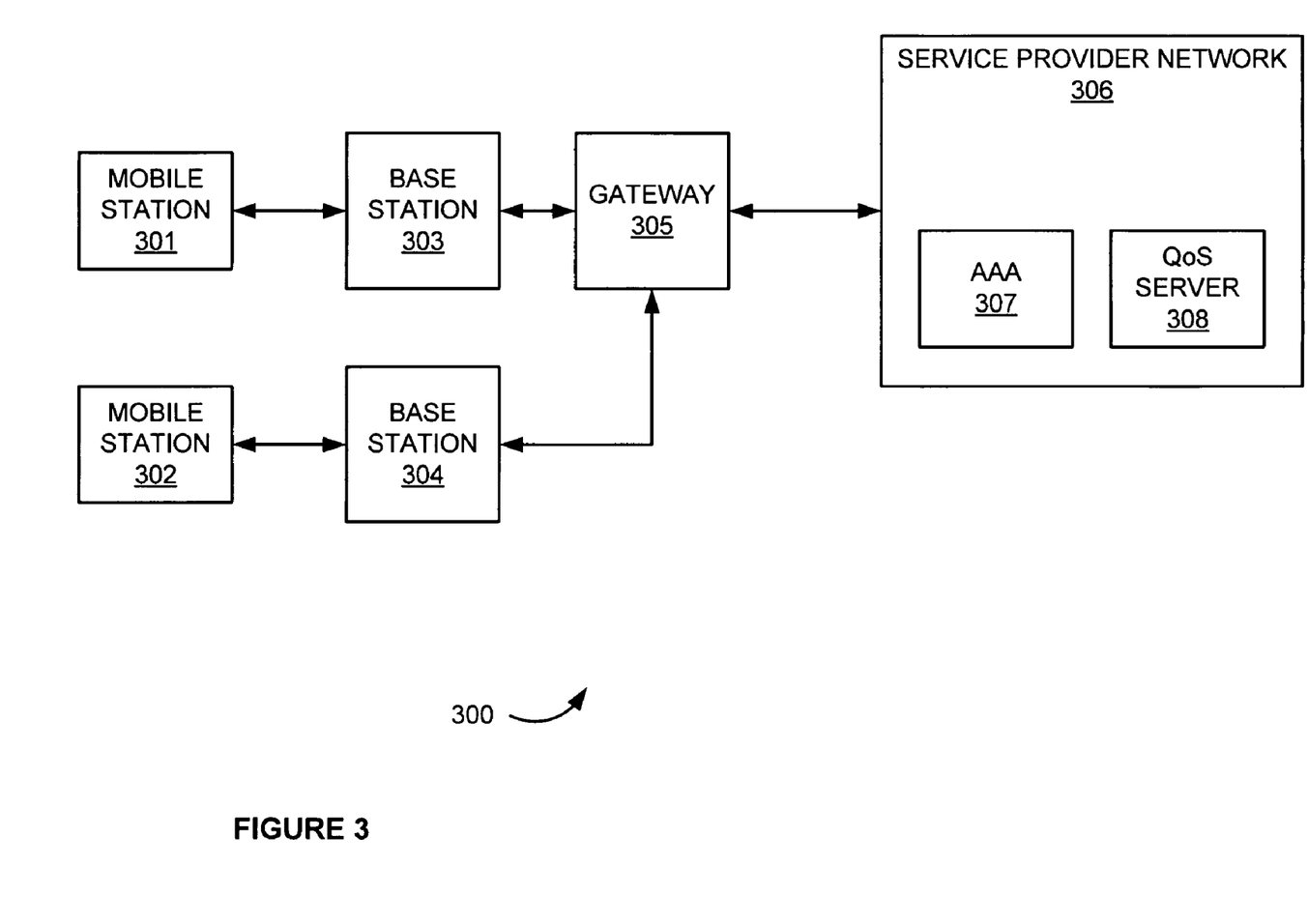
FIG. 3 is a block diagram illustrating an embodiment of a communication system for allocating use of a communication network among multiple devices.

FIG. 3 provides a block diagram illustrating an embodiment for communication system 300. Communication system 300 comprises a mobile station 301, mobile station 302, base station 303, base station 304, gateway 305 and service provider network 306. Service provider network 306 further comprises AAA 307 and QoS server 308. Mobile station 301 exchanges information with base station 303 and mobile station 302 exchanges information with base station 304. Base stations 303 and 304 exchange information with gateway 305. Gateway 305 exchanges information with service provider network 306. Thus, mobile stations 301 and 302 are in communication with service provider network 306 utilizing base station 303, base station 304, and gateway 305.

Mobile stations 301 and 302 may be any device that has wireless communication connectivity utilizing any high-speed data protocol. High-speed data protocols comprise Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX) and the like. Mobile station 301 and mobile station 302 could include telephones, smartphones, mobile phones, cellular phones, personal digital assistants (PDAs), personal communicators, handheld game consoles, personal computers (PCs), Ultra-Mobile personal computers (UMPCs), handheld televisions and any other consumer appliance with wireless communication capabilities.

Base station 303 and base station 304 may be any wireless system that provides the air interface to the mobile station and communication connectivity to the communication network. Examples of base stations that may be utilized include, base transceiver stations (BTSs), radio base stations (RBSs), Node B, enhanced Node B (eNBs) and others. Base stations 303 and 304 may include a number of elements known to those skilled in the art comprising a transceiver, power amplifier, combiner, duplexer, antenna and control function.

Gateway 305 provides communication connectivity and acts as an aggregator of traffic or interworking device between base stations 303 and 304 and service provider network 306. Examples of gateway 305 may include an access service network gateway (ASN-GW), wireless local access network access gateway (WAG), packet data gateway (PDG), mobile switching center (MSC) and packet data serving node (PDSN).

Service provider network 306 may be any communication network that provides connectivity to public or private networks including the Internet, public switched telephone network (PSTN), private intranets and the like. Service provider network 306 also performs many management functions for its mobile subscribers. Management functions may include billing, authenticating and other network management functions to facilitate tracking a user's activity on a telecommunications network. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management.

AAA 307 provides the necessary authentication, authorizing and accounting functions for service provider network 306. AAA 307 may reside within service provider network 306 or may be remote to service provider network 306.

QoS server 308 is any computing platform that may store and enforce quality of service profiles for a network's subscribers. QoS server 308 may reside within or remotely to service provider network 306. Further, the function of QoS server 308 may reside independently of other network management elements or may be bundled with other network elements such as AAA 307. QoS server 303 maintains the QoS profile described above for a user's account. As noted, the QoS profile may include a bandwidth parameter, criteria or threshold that would determine the permitted use of a network's resources by a user's applications and devices.

Figure 4A:
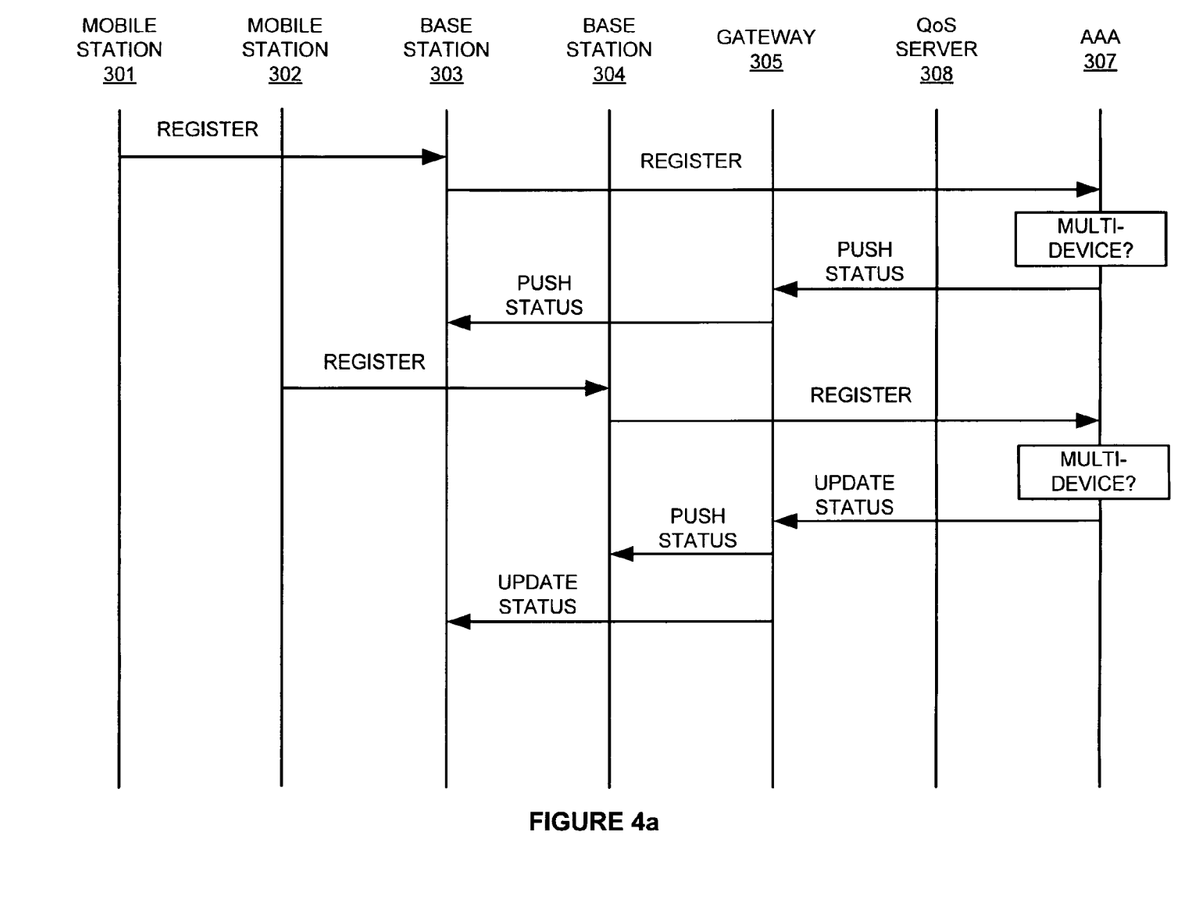
FIG. 4*a* is a flow diagram illustrating an example of registering multiple mobile stations on a communication system.
Figure 4B:
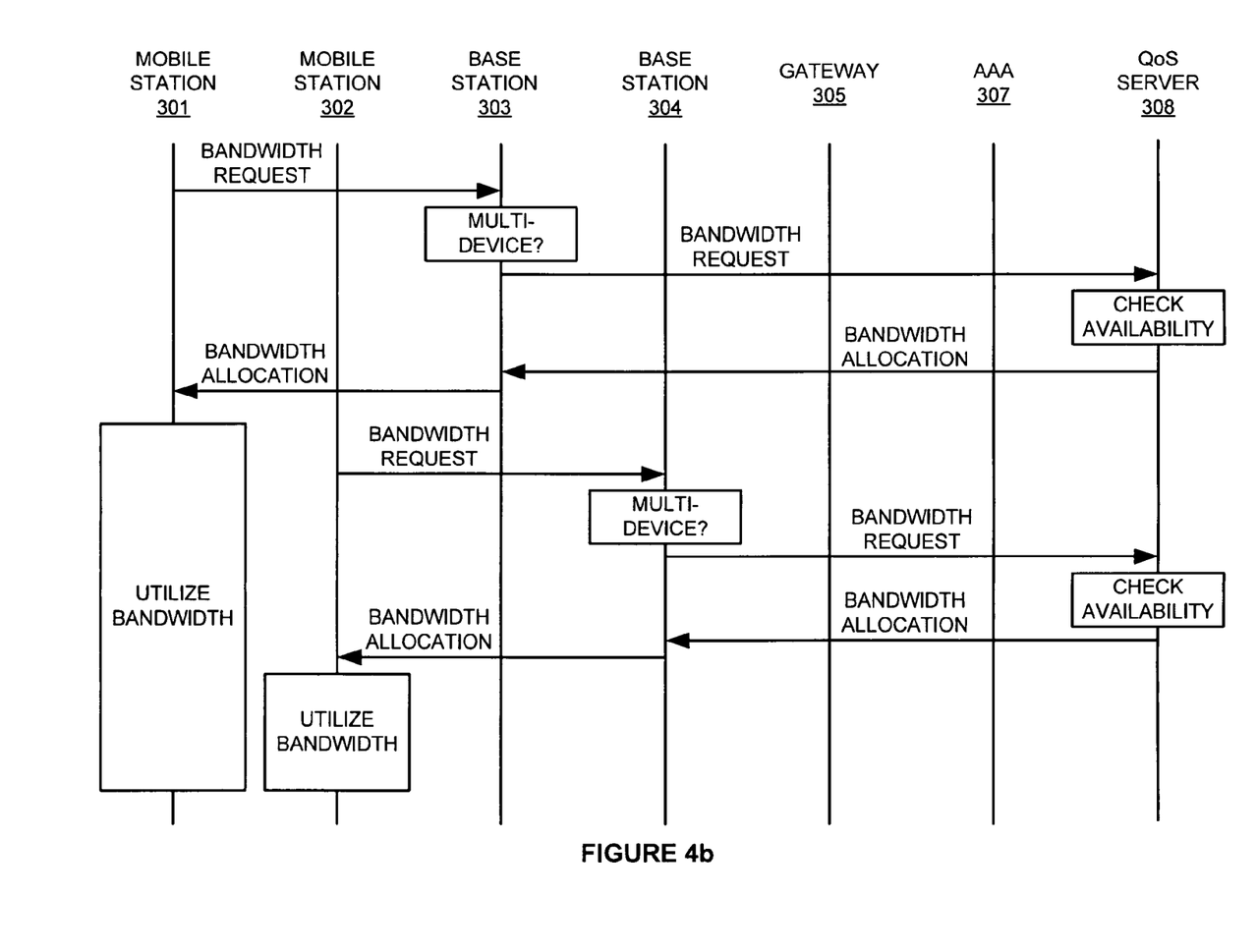
FIG. 4*b* is a flow diagram illustrating an example of allocating bandwidth to multiple mobile stations in a communication system.
Figure 4C:
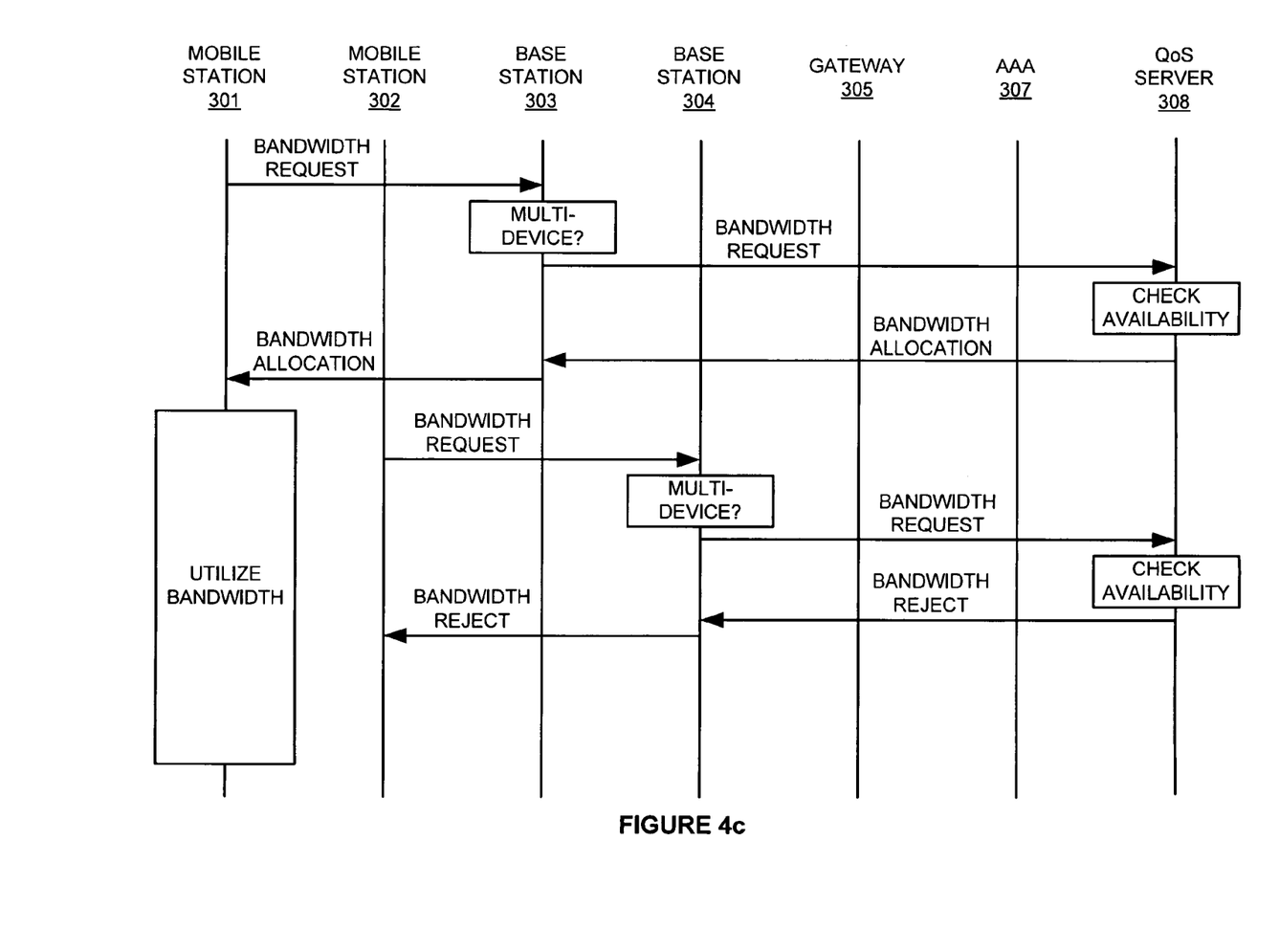
FIG. 4*c* is a flow diagram illustrating an example of allocating bandwidth to multiple mobile stations in a communication system.

FIGS. 4a, 4b and 4c illustrate flow diagrams for utilizing the method of FIG. 2 and the block diagram in FIG. 3. It should be noted that in this embodiment, mobile stations 301 and 302 are operated by a single user having a single user account to operate on communication system 300. It should also be understood that a single user may be authorized to operate more than two devices on communication system 300 and not just mobile stations 301 and 302 as illustrated in FIGS. 3, 4a, 4b, 4c, 5 and 6. Additionally, FIGS. 3, 4a, 4b, 4c, 5 and 6 illustrate mobile station 301 communicating with base station 303 and mobile station 302 communicating with base station 304. It should be understood that this embodiment also allows for mobile stations 301 and 302 to communicate with the same base station—either base station 303 or 304.

Referring to FIG. 4a, in operation, mobile station 301 exchanges information with base station 303 and provides registration information that may include the user, device and other relevant data to begin authorizing mobile station 301 to operate on communication system 300. Base station 303 provides the registration information to AAA 307 so AAA 307 may grant permissions and other management functions for communication system 300. AAA 307 determines that the user associated with mobile station 301 has multiple devices assigned to the user's account. If this is the first device that is registering on communication system 300, this fact is noted in a status message indicating that mobile station 301 is currently the only device seeking to utilize or is utilizing communication system 300. AAA 307 communicates the status message to gateway 305 and gateway 305 communicates the status message to base station 303.

A second device, mobile station 302, then exchanges information with base station 304 and provides registration information to allow mobile station 302 to operate and have access to communication system 300. Base station 304 provides the registration message to AAA 307 to perform its authorization, authentication and accounting functions to grant permission to mobile station 302 to operate on communication system 300. Once again, AAA 307 determines if the user associated with mobile device 302 has multiple devices assigned to its account. Upon determining that the user account allows for multiple devices and that the user is accessing or utilizing communication network with mobile station 301, AAA 307 communicates an updated status message to gateway 305 indicating that the user is requesting to operate multiple devices on communication system 300. Gateway 305 communicates the updated status message to base station 304 and base station 303 indicating the updated status that the user is operating multiple devices. While it is shown that gateway 305 provides the updated status message to bases station 303, one skilled in the art would understand that AAA 307 may communicate the updated status message itself.

It should be noted that the registration messages used by mobile stations 301 and 302 could be any message utilized by a particular wireless protocol to allow subscribers to use communication system 300. Examples include network acquisition messages, device authentication messages and user authentication messages. It should also be noted that different network elements, such as base stations, access gateways and AAA servers, may be configured to receive and process these registration messages.

Referring now to FIG. 4b, communication system 300 now knows that a user is seeking to operate or is operating multiple devices on communication system 300. Mobile station 301 then communicates a bandwidth request to base station 303. Base station 303 has the updated status of the user operating multiple devices and communicates to QoS server 308 to determine the availability of network resources on communication system 300. As discussed above, one such network resource is bandwidth availability on the network. QoS server 308 uses the QoS profile to determine the appropriate bandwidth allocation and communicates the allocation to base station 303. Base station 303 then provides the bandwidth allocation to mobile station 301 and mobile station 301 begins utilizing the allocated bandwidth.

Mobile station 302 communicates a bandwidth request to base station 304. Base station 304 has the updated status of the user's account indicating that the user is operating or is registering to operate multiple devices on communication system 300. Base station 304 provides the bandwidth request to QoS server 308 and QoS server 308 determines the available bandwidth available for mobile station 302 using the user's QoS profile and the current bandwidth utilization by mobile station 301. QoS server 308 allocates bandwidth for mobile station 302 and communicates this to base station 304. Base station 304 provides the bandwidth allocation message to mobile station 302 and mobile station 302 begins utilizing its allocated bandwidth.

Referring now to FIG. 4c, another example is illustrated for utilizing the communication system 300 in FIG. 3. Mobile station 301 communicates a bandwidth request to base station 303. Base station 303 has the updated status of the user operating multiple devices and communicates to QoS server 308 to determine the availability of network resources on communication system 300. As discussed above, one such network resource is bandwidth availability on the network. QoS server 308 uses the QoS profile to determine the appropriate bandwidth allocation and communicates the allocation to base station 303. Base station 303 then provides the bandwidth allocation to mobile station 301 and mobile station 301 begins utilizing the allocated bandwidth.

Mobile station 302 communicates a bandwidth request to base station 304. Base station 304 has the updated status of the user's account indicating that the user is operating or is registering to operate multiple devices on communication system 300. Base station 304 provides the bandwidth request to QoS server 308 and QoS server 308 determines the available bandwidth available for mobile station 302 using the user's QoS profile and the current bandwidth utilization by mobile station 301. If QoS server 308 determines that the bandwidth allocated to mobile device 301 is consuming the user's entire allocation in the QoS profile, QoS server 308 communicates a bandwidth rejection message to base station 304. Base station 304 in turn provides the rejection message to mobile station 302 and the mobile station is denied the bandwidth resources.

Note that FIGS. 4b and 4c illustrate QoS server 308 determining the availability of bandwidth for a single user's account. It should be understood that the QoS server functionality, including the QoS profile, could reside in AAA 307 and advantageously reduce the number of network elements in communication system 300.

Figure 5:
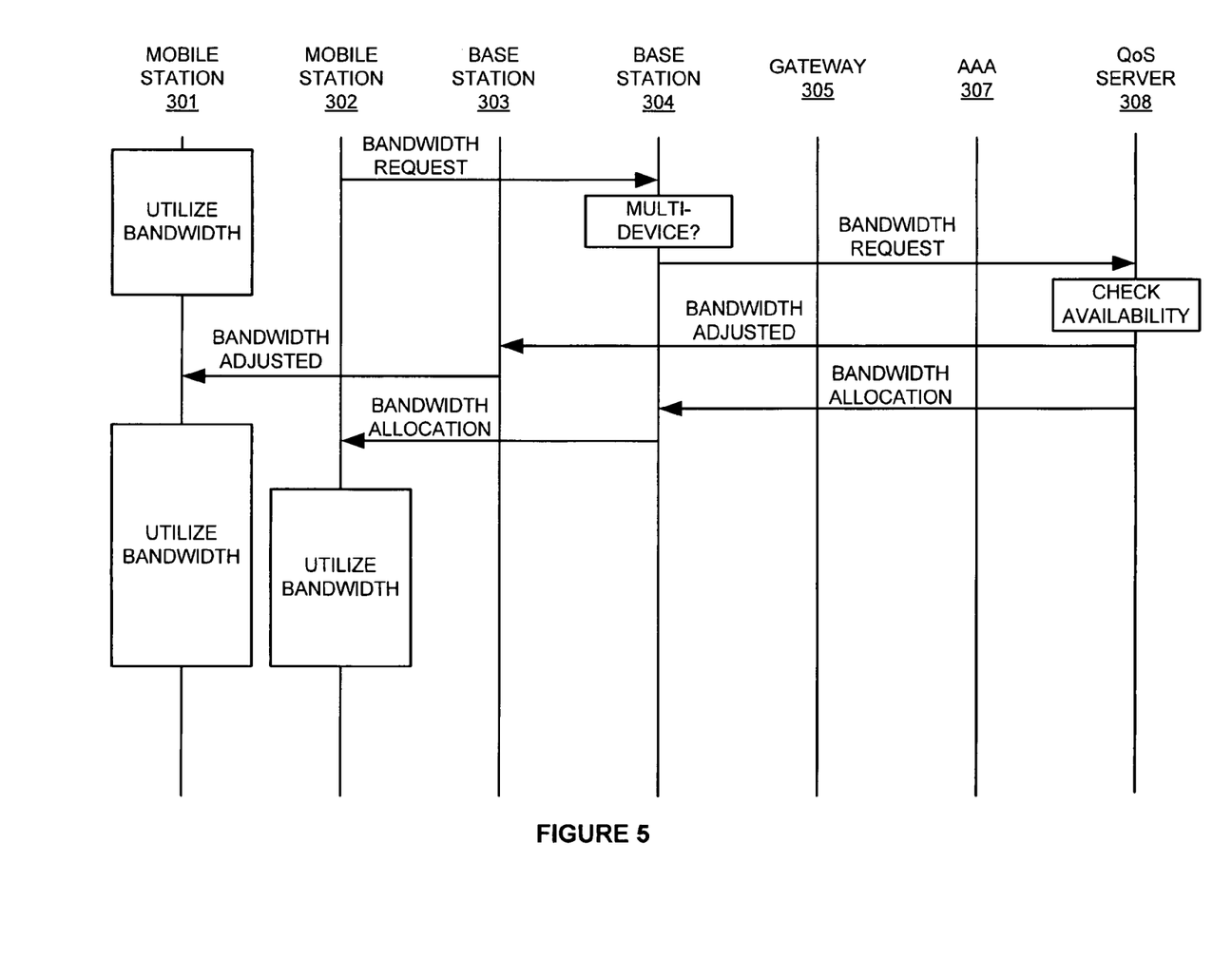
FIG. 5 is a flow diagram illustrating an example of allocating bandwidth to multiple mobile stations in a communication system.

FIG. 5 is a flow diagram illustrating another embodiment for communication system 300 in FIG. 3. Mobile station 301 is utilizing its allocated bandwidth when mobile station 302 communicates a bandwidth request to base station 304. Base station 304 has the current status showing that the user has multiple devices operating on communication system 300 and communicates a bandwidth request to QoS server 308. In this example, QoS server 308 determines using the QoS profile that mobile station 302 has priority over mobile device 301. As such, the bandwidth to mobile station 301 needs to be adjusted to accommodate the bandwidth request from mobile station 302.

QoS server 308 communicates a bandwidth reduction message to base station 303 and a bandwidth allocation message to base station 304. Base station 303 communicates the bandwidth adjustment to mobile station 301 and mobile station 301 begins utilizing the new bandwidth allocation. Base station 304 provides the bandwidth allocation message to mobile station 302 and mobile station 302 begins utilizing its allotted bandwidth.

Figure 6:
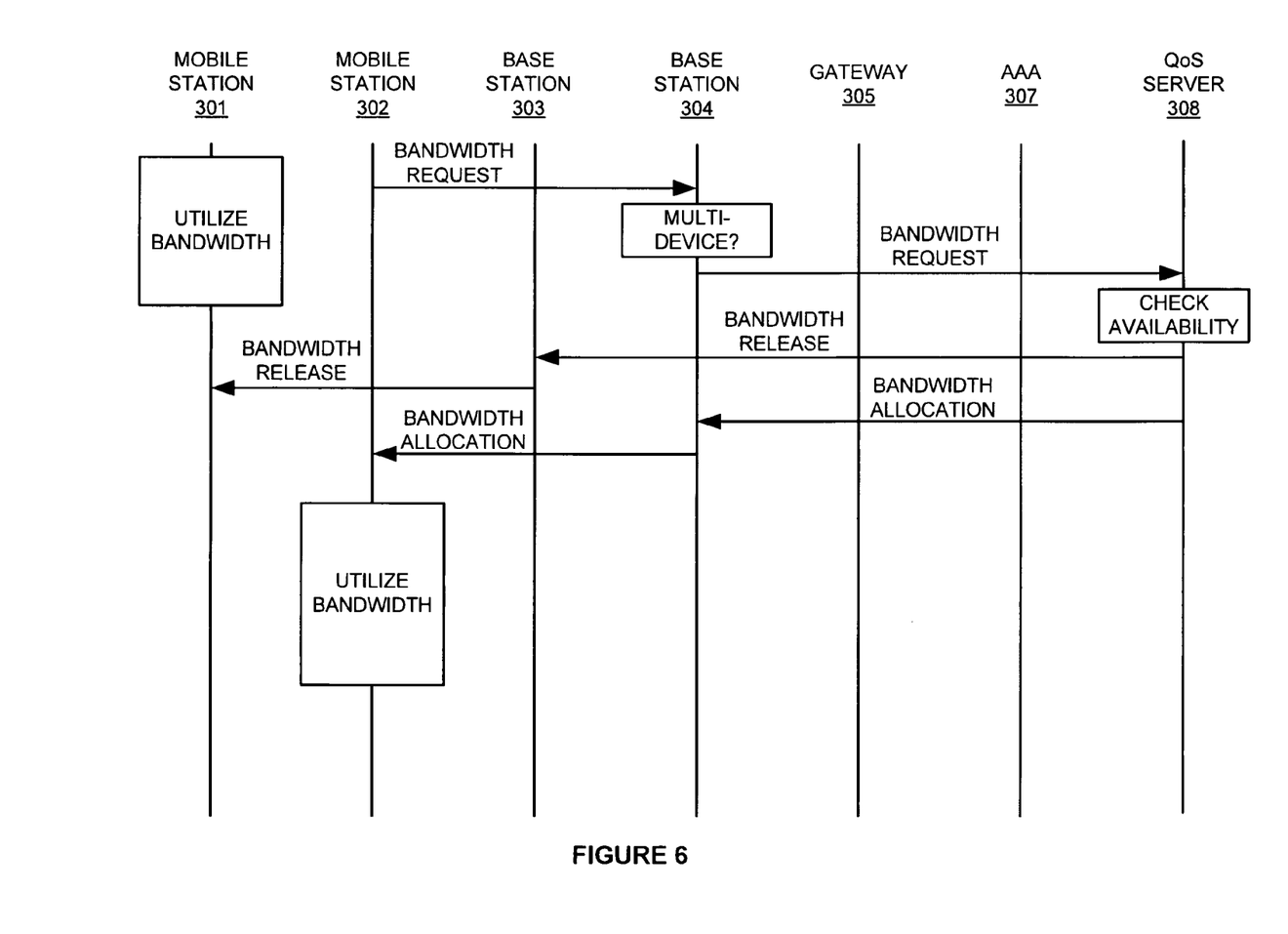
FIG. 6 is a flow diagram illustrating an example of allocating bandwidth to multiple mobile stations in a communication system.

FIG. 6 is a flow diagram illustrating yet another embodiment for communication system 300 in FIG. 3. Mobile station 301 is utilizing its allocated bandwidth when mobile station 302 communicates a bandwidth request to base station 304. Base station 304 has the current status showing that the user has multiple devices operating on communication system 300 and communicates a bandwidth request to QoS server 308. In this example, QoS server 308 determines using the QoS profile that mobile station 302 has priority over mobile device 301 and that all bandwidth resources available in the QoS profile should be reserved for mobile station 302. As such, the bandwidth to mobile station 301 needs to be released to accommodate the bandwidth request from mobile station 302.

QoS server 308 communicates a bandwidth release message to base station 303 and a bandwidth allocation message to base station 304. Base station 303 communicates the bandwidth release message to mobile station 301 and mobile station 301 ends utilizing its bandwidth allocation. Base station 304 provides the bandwidth allocation message to mobile station 302 and mobile station 302 begins utilizing its allotted bandwidth.

Figure 7:
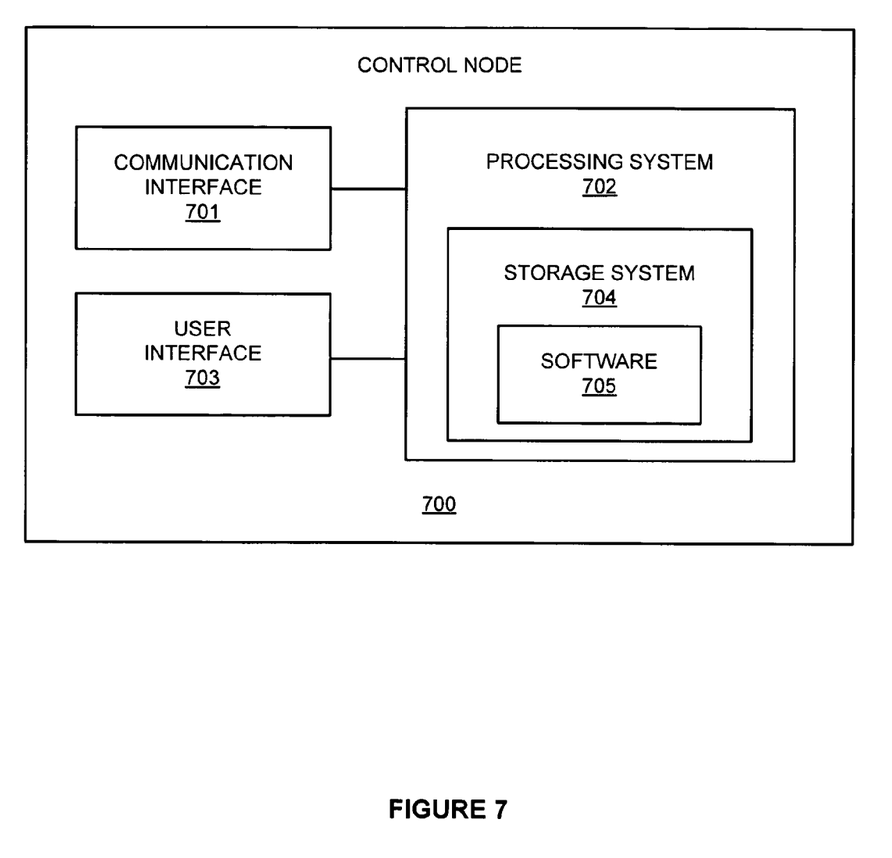
FIG. 7 is a block diagram illustrating a control node.

FIG. 7 is a block diagram illustrating a computing system that may be utilized by the network elements described in FIGS. 1 and 3 and for the methods described herein. Control node 700 includes communication interface 701, processing system 702, and user interface 703. Processing system 702 includes storage system 704. Storage system 704 stores software 705. Processing system 702 is linked to communication interface 701 and user interface 703. Control node 700 could be comprised of a programmed general-purpose computer, although those skilled in the art will appreciate that programmable or special purpose circuitry and equipment may be used. Control node 700 may be distributed among multiples devices that together comprise elements 700-705.

Communication interface 701 could comprise a network interface, modem, port, transceiver, or some other communication device. Communication interface 701 may be distributed among multiple communication devices. Processing system 702 could comprise a computer microprocessor, logic circuit, or some other processing device. Processing system 702 may be distributed among multiple processing devices. User interface 703 could comprise a keyboard, mouse, voice recognition interface, microphone and speakers, graphical display, touch screen, or some other type of user device. User interface 703 may be distributed among multiple user devices. Storage system 704 could comprise a disk, tape, integrated circuit, server, or some other memory device. Storage system 704 may be distributed among multiple memory devices.

Processing system 702 retrieves and executes software 705 from storage system 704. Software 705 may comprise an operating system, utilities, drivers, networking software, and other software typically loaded onto a computer system. Software 705 could comprise an application program, firmware, or some other form of machine-readable processing instructions. When executed by processing system 702, software 705 directs processing system 702 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for allocating usage of network resources in a communication network, the method comprising:

establishing a quality of service profile assigned to a user account having a first wireless device and a second wireless device associated therewith, wherein the quality of service profile indicates a total amount of data throughput on the communication network available for both the first wireless device and the second wireless device and wherein the quality of service profile comprises a priority criteria indicating a higher priority for the second wireless device than for the first wireless device;

receiving a first usage request for access to the communication network transmitted from the first wireless device associated with the user account, registering the first wireless device on the communication network, and allowing the first wireless device to access the communication network in response to the first usage request;

allocating a first amount of data throughput of the total amount of data throughput on the communication network to the first wireless device based upon the quality of service profile;

receiving a second usage request for access to the communication network transmitted from the second wireless device associated with the user account, registering the second wireless device on the communication network, and allowing the second wireless device to access the communication network in response to the second usage request; and allocating more than a remaining amount of data throughput of the total amount of data throughput on the communication network to the second wireless device by reducing the first amount of data throughput allocated to the first wireless device based on the priority criteria indicating the higher priority for the second wireless device than for the first wireless device.

2. The method of claim 1 wherein the quality of service profile comprises a usage criteria for the user account.

3. The method of claim 2 wherein the usage criteria comprises a bandwidth criteria for the user account.

4. The method of claim 2 further comprising rejecting the first usage request for access to the communication network transmitted from the first wireless device when the usage criteria is exceeded.

5. The method of claim 1 wherein the quality of service profile indicates an amount of data throughput of the total amount of data throughput that should be reserved for the second wireless device.

6. The method of claim 5 wherein allocating more than the remaining amount of data throughput of the total amount of data throughput on the communication network to the second wireless device by reducing the first amount of data throughput allocated to the first wireless device comprises reducing the first amount of data throughput allocated to the first wireless device by the amount of data throughput reserved for the second wireless device.

7. The method of claim 1 wherein allocating more than the remaining amount of data throughput of the total amount of data throughput on the communication network to the second wireless device by reducing the first amount of data throughput allocated to the first wireless device comprises releasing the first amount of data throughput allocated to the first wireless device.

8. The method of claim 7 wherein releasing the first amount of data throughput allocated to the first wireless device comprises transmitting a bandwidth release message for delivery to a base station serving the first wireless device.

9. The method of claim 8 wherein the base station is configured to terminate the first amount of data throughput allocated to the first wireless device in response to the bandwidth release message.

10. The method of claim 9 wherein the first wireless device ceases to utilize the first amount of data throughput after the base station terminates the first amount of data throughput allocated to the first wireless device.

11. A communication system for allocating usage of network resources for a user account in a communication network for a first wireless device and a second wireless device associated with the user account, the system comprising:
- a user account database comprising a quality of service profile assigned to the user account, wherein the quality of service profile indicates a total amount of data throughput on the communication network available for both the first wireless device and the second wireless device and wherein the quality of service profile comprises a priority criteria indicating a higher priority for the second wireless device than for the first wireless device; and
- a control node configured to receive a first usage request for access to the communication network transmitted from the first wireless device associated with the user account, register the first wireless device on the communication network, allow the first wireless device to access the communication network in response to the first usage request, and allocate a first amount of data throughput of the total amount of data throughput on the communication network to the first wireless device based on the quality of service profile;
- the control node further configured to receive a second usage request for access to the communication network transmitted from the second wireless device associated with the user account, register the second wireless device on the communication network, allow the second wireless device to access the communication network in response to the second usage request, and allocate more than a remaining amount of data throughput of the total amount of data throughput on the communication network to the second wireless device by reducing the first amount of data throughput allocated to the first wireless device based on the priority criteria indicating the higher priority for the second wireless device than for the first wireless device.

12. The communication system of claim 11 wherein the quality of service profile comprises a usage criteria for the user account.

13. The communication system of claim 12 wherein the usage criteria comprises a bandwidth criteria for the user account.

14. The communication system of claim 12 wherein the control node is configured to reject the first usage request for access to the communication network transmitted from the first wireless device when the usage criteria is exceeded.

15. The communication system of claim 11 wherein the quality of service profile indicates an amount of data throughput of the total amount of data throughput that should be reserved for the second wireless device.

16. The communication system of claim 15 wherein the control node configured to allocate more than the remaining amount of data throughput of the total amount of data throughput on the communication network to the second wireless device by reducing the first amount of data throughput allocated to the first wireless device comprises the control node configured to reduce the first amount of data throughput allocated to the first wireless device by the amount of data throughput reserved for the second wireless device.

17. The communication system of claim 11 wherein the control node configured to allocate more than the remaining amount of data throughput of the total amount of data throughput on the communication network to the second wireless device by reducing the first amount of data throughput allocated to the first wireless device comprises the control node configured to release the first amount of data throughput allocated to the first wireless device.

18. The communication system of claim 17 wherein the control node configured to release the first amount of data throughput allocated to the first wireless device comprises the control node configured to transmit a bandwidth release message for delivery to a base station serving the first wireless device.

19. The communication system of claim 18 wherein the base station is configured to terminate the first amount of data throughput allocated to the first wireless device in response to the bandwidth release message.

20. The communication system of claim 19 wherein the first wireless device ceases to utilize the first amount of data throughput after the base station terminates the first amount of data throughput allocated to the first wireless device.

* * * * *